US012786846B2

(12) United States Patent
Hata et al.

(10) Patent No.: US 12,786,846 B2
(45) Date of Patent: Nov. 3, 2026

(54) COMMUNICATION CONTROL METHOD AND BASE STATION

(71) Applicant: KYOCERA Corporation, Kyoto (JP)

(72) Inventors: Mitsutaka Hata, Yokohama (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 286 days.

(21) Appl. No.: 18/425,884

(22) Filed: Jan. 29, 2024

(65) Prior Publication Data

US 2024/0172089 A1 May 23, 2024

Related U.S. Application Data

(63) Continuation of application No. PCT/JP2022/028725, filed on Jul. 26, 2022.

(30) Foreign Application Priority Data

Jul. 29, 2021 (JP) ................................ 2021-124541

(51) Int. Cl.

| | |
|---|---|
| ***H04W 48/02*** | (2009.01) |
| ***H04W 48/16*** | (2009.01) |
| ***H04W 60/04*** | (2009.01) |
| ***H04W 60/06*** | (2009.01) |

(52) U.S. Cl.

CPC ........... *H04W 48/02* (2013.01); *H04W 48/16* (2013.01); *H04W 60/04* (2013.01); *H04W 60/06* (2013.01)

(58) Field of Classification Search

CPC ..... H04W 48/02; H04W 48/16; H04W 60/04; H04W 60/06; H04W 28/24; H04W 48/18; H04W 92/12

See application file for complete search history.

(56) References Cited

U.S. PATENT DOCUMENTS

| | | | | |
|---|---|---|---|---|
| 2019/0357131 | A1* | 11/2019 | Sivavakeesar | H04W 68/02 |
| 2020/0120547 | A1* | 4/2020 | Han | H04W 36/24 |
| 2021/0160763 | A1* | 5/2021 | Lou | H04W 28/0289 |
| 2022/0007182 | A1 | 1/2022 | Stojanovski et al. | |
| 2022/0217593 | A1* | 7/2022 | Yang | H04W 28/0257 |
| 2022/0264444 | A1* | 8/2022 | Ryu | H04W 48/18 |
| 2022/0369207 | A1 | 11/2022 | Ianev et al. | |
| 2023/0262591 | A1 | 8/2023 | Ishii | |
| 2024/0049290 | A1 | 2/2024 | Cheng et al. | |

OTHER PUBLICATIONS

3rd Generation Partnership Project; Technical Specification Group Radio Access Network; NR; NR and NG-RAN Overall Description; Stage 2; 3GPP TS 38.300 V16.1.0; Mar. 2020; pp. 1-133; Release 16; 3GPP Organizational Partners.

* cited by examiner

*Primary Examiner* — Rina C Pancholi

(74) *Attorney, Agent, or Firm* — Studebaker Brackett PLLC

(57) ABSTRACT

A communication control method includes determining, at a base station, a restrictive condition that is a condition for restricting use of a network slice, and transmitting, at the base station, restriction information related to the network slice to a core network apparatus, a certain base station other than the base station, or a user equipment.

4 Claims, 15 Drawing Sheets

COMMUNICATION CONTROL METHOD AND BASE STATION

RELATED APPLICATIONS

The present application is a continuation based on PCT Application No. PCT/JP2022/028725, filed on Jul. 26, 2022, which claims the benefit of Japanese Patent Application No. 2021-124541 filed on Jul. 29, 2021. The content of which is incorporated by reference herein in their entirety.

TECHNICAL FIELD

The present disclosure relates to a communication control method and a base station used in a mobile communication system.

BACKGROUND OF INVENTION

In standards of the Third Generation Partnership Project (3GPP), which is a standardization project for mobile communication systems, Network Slicing has been defined (for example, see Non-Patent Document 1).

For example, a network slice can be constructed for each service type such as enhanced Mobile Broad Band (eMBB: high speed and large capacity). This allows, for example, the network to provide the user with a network slice that matches each service.

CITATION LIST

Non-Patent Literature

Non-Patent Document 1: 3GPP TS 38.300 V16.1.0

SUMMARY

A communication control method according to an embodiment includes determining, at a base station, a restrictive condition that is a condition that restricts use of a network slice; and transmitting, at the base station, restriction information related to the network slice to a core network apparatus, a certain base station other than the base station, or a user equipment.

DESCRIPTION OF EMBODIMENTS

A core network apparatus may determine a restrictive condition for a network slice. This may disable the base station or the user equipment from using such network slices.

The present disclosure provides appropriate use of a network slice for which a restrictive condition is determined.

A mobile communication system according to an embodiment is described with reference to the drawings. In the description of the drawings, the same or similar parts are denoted by the same or similar reference signs.

Configuration of Mobile Communication System

Figure 1:
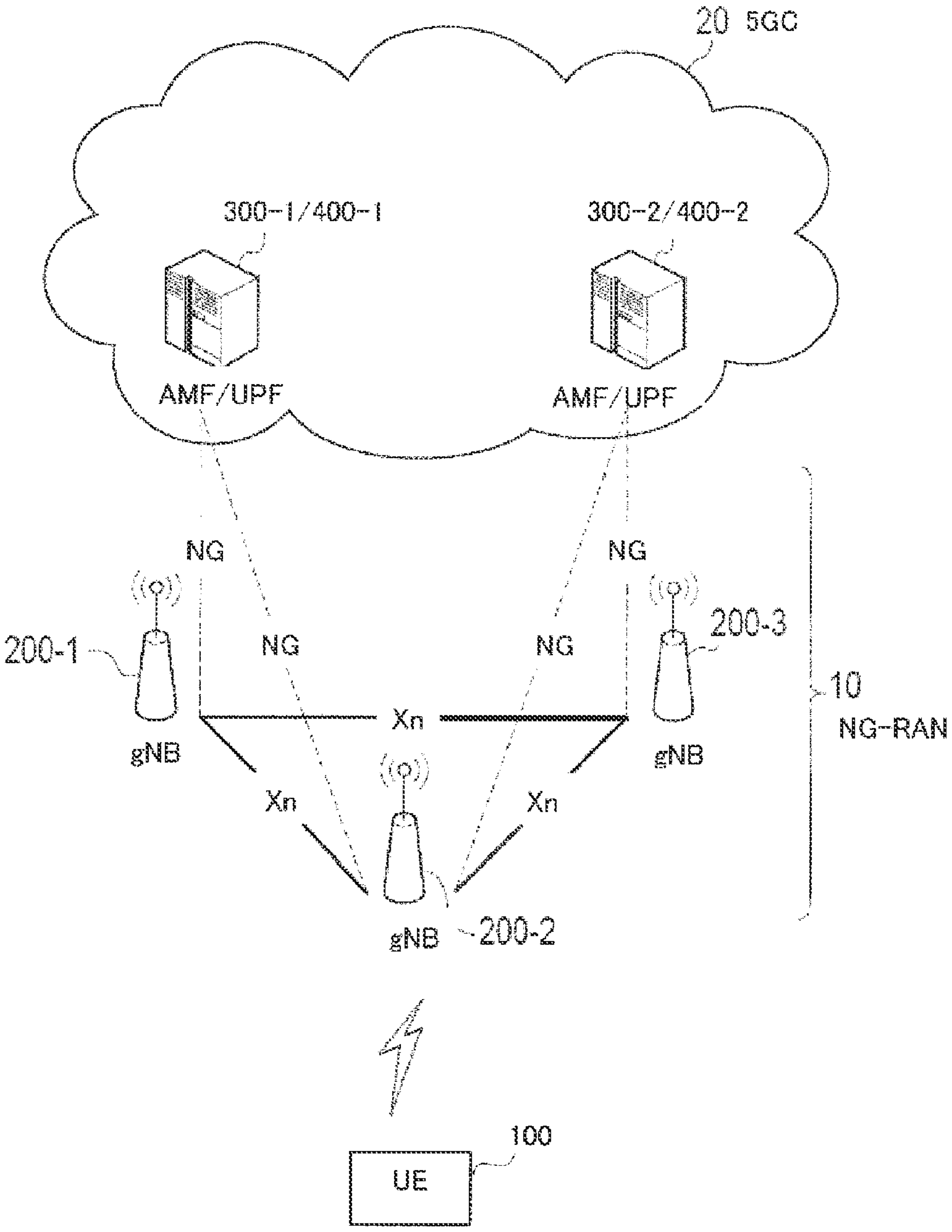
FIG. 1 is a diagram illustrating a configuration of a mobile communication system according to an embodiment.

First, in an embodiment, a configuration of a mobile communication system is described with reference to FIGS. 1 to 6. FIG. 1 is a diagram illustrating a configuration of the mobile communication system according to an embodiment. The mobile communication system 1 complies with the 5th Generation System (5GS) of the 3GPP standard. The description below takes the 5GS as an example, but Long Term Evolution (LTE) system may be at least partially applied to the mobile communication system. A sixth generation (6G) system may be at least partially applied to the mobile communication system.

The mobile communication system 1 includes a User Equipment (UE) 100, a 5G radio access network (Next Generation Radio Access Network (NG-RAN)) 10, and a 5G Core Network (5GC) 20.

The UE 100 is a mobile wireless communication apparatus. The UE 100 may be any apparatus as long as the UE 100 is used by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or more cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency. An XnAP (Application Protocol) message is transmitted and received between the gNBs 200 on the Xn interface.

Note that the gNB can be connected to an Evolved Packet Core (EPC) corresponding to a core network of LTE. An LTE base station (i.e., eNB) can be connected to the 5GC. The LTE base station and the gNB can be connected via an inter-base station interface. The LTE base stations connected to the 5GC 20 may be referred to as an ng-eNB. Hereinafter, the "gNB" may be interpreted as the "ng-eNB" or the "eNB".

The 5GC 20 includes an Access and Mobility Management Function (AMF) 300 and a User Plane Function (UPF) 400. The AMF 300 performs various types of mobility controls and the like for the UE 100. The AMF 300 manages mobility of the UE 100 by communicating with the UE 100 by using Non-Access Stratum (NAS) signaling. The UPF 400 controls data transfer. The AMF 300 and the UPF 400 are connected to the gNB 200 via an NG interface which is an interface between the base station and the core network. Specifically, the gNB 200 is interconnected to the AMF 300 via an NG-C interface and connected to the UPF 400 via an NG-U interface. An NGAP (Application Protocol) message is transmitted and received between the gNB 200 and the AMF 300 on the NG-C interface.

Figure 2:
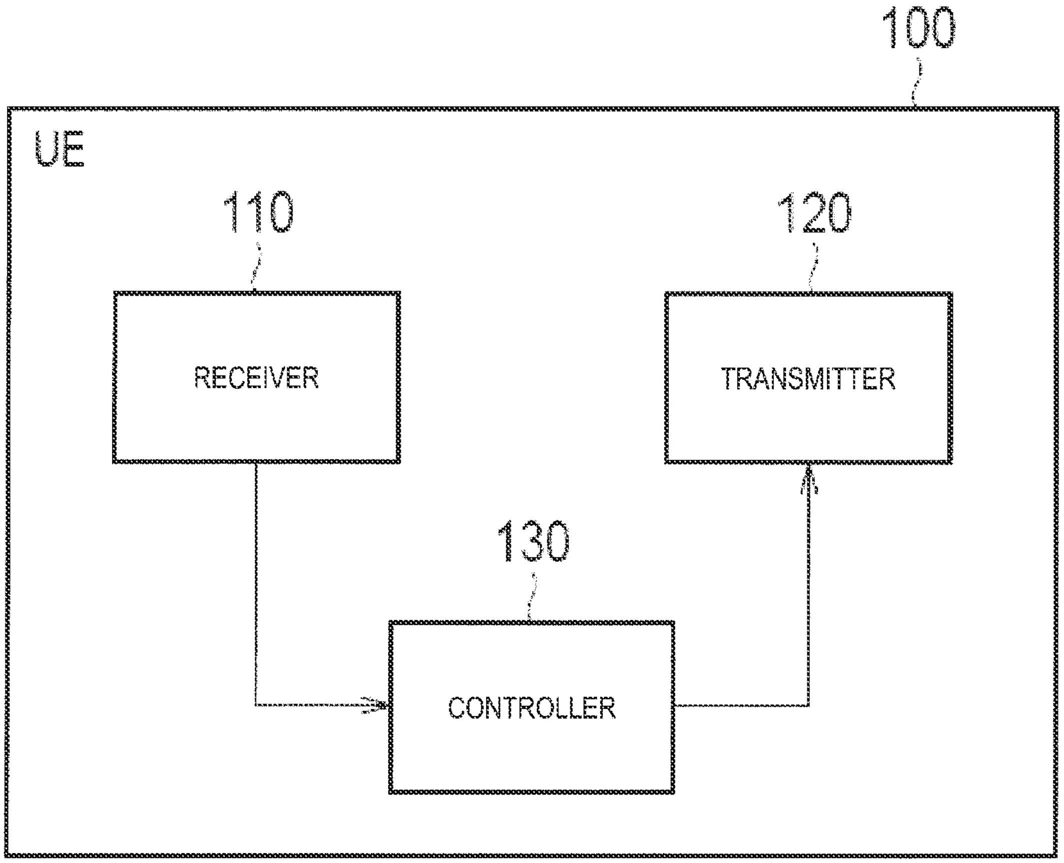
FIG. 2 is a diagram illustrating a configuration of a user equipment (UE) according to an embodiment.

FIG. 2 is a diagram illustrating a configuration of the user equipment (UE) 100 according to an embodiment. The UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal (a transmission signal) output by the controller 130 into a radio signal and transmits the resulting signal through the antenna.

The controller 130 performs various types of control and processes in the UE 100. Such processing includes processing of each layer described later. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
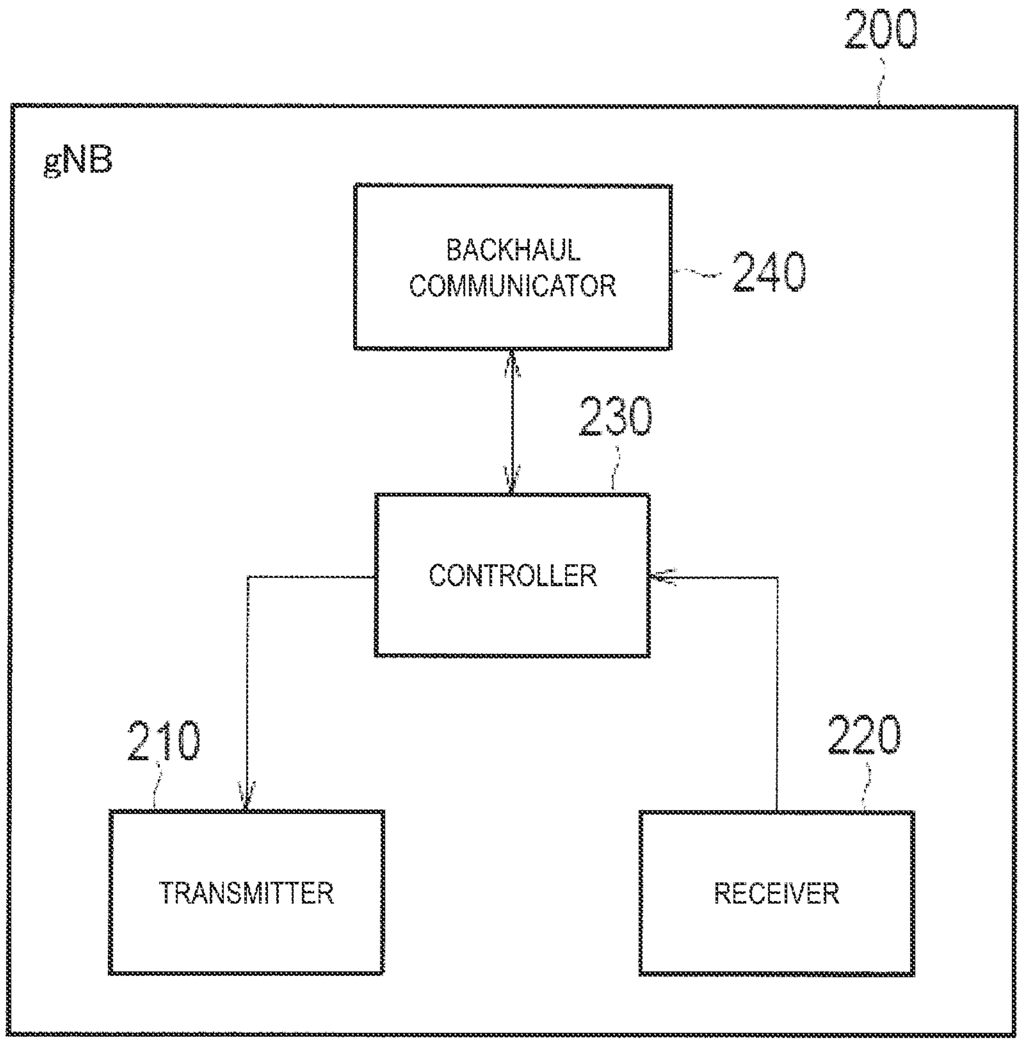
FIG. 3 is a diagram illustrating a configuration of a base station (gNB) according to an embodiment.

FIG. 3 is a diagram illustrating a configuration of the base station (gNB) 200 according to an embodiment. The gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal (a transmission signal) output by the controller 230 into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of control and processing in the gNB 200. Such processing includes processing of each layer described later. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
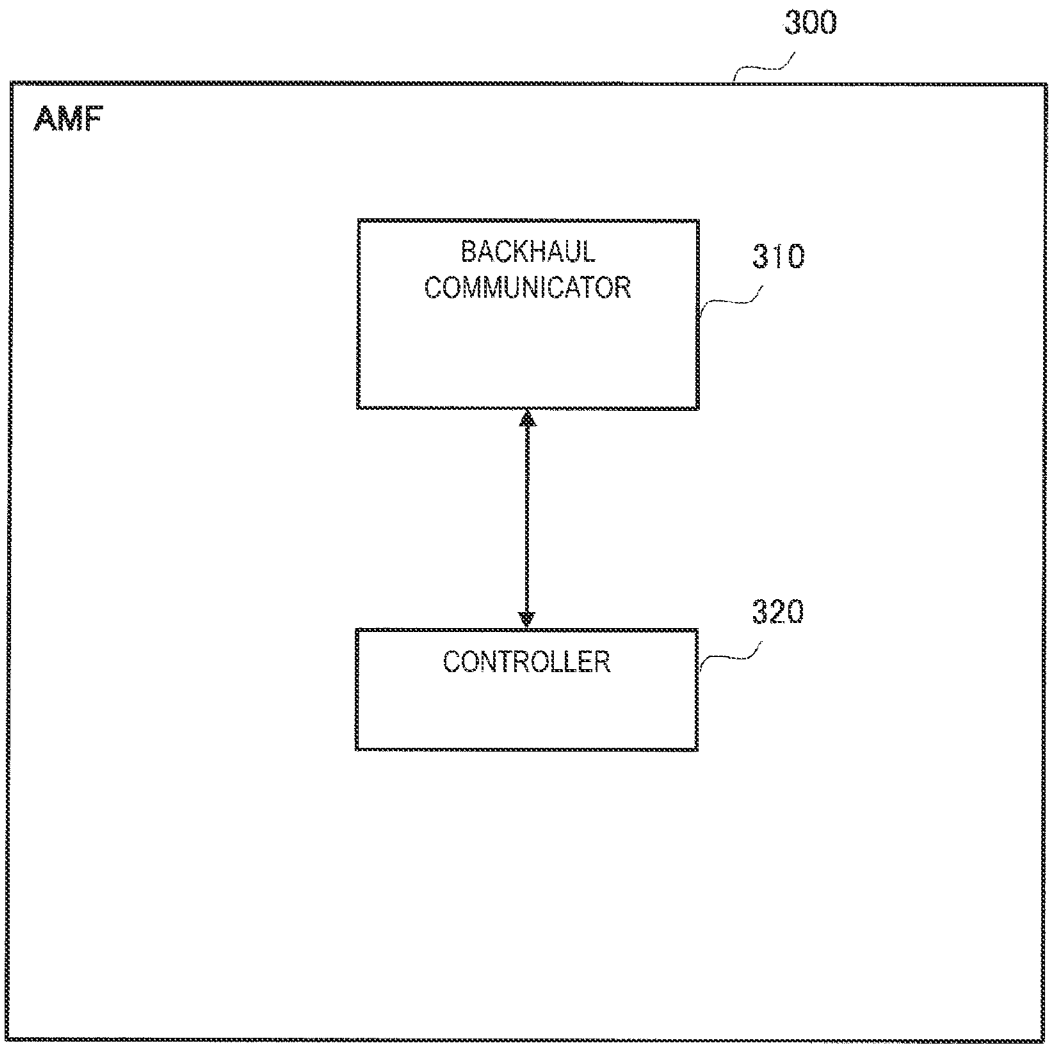
FIG. 4 is a diagram illustrating a configuration of a core network apparatus (AMF) according to an embodiment.

FIG. 4 is a diagram illustrating a configuration of the AMF 300 (core network apparatus) according to an embodiment. The AMF 300 includes a backhaul communicator 310 and a controller 320. Note that an example of the core network apparatus is the AMF 300, but the core network apparatus may be the UPF 400.

The backhaul communicator 310 is connected to the base station via the interface between the base station and the core network.

The controller 320 performs various types of control and processing in the AMF 300. Such processing includes processing of each layer described later. The AMF 300 includes at least one processor and at least one memory. The memory stores a program to be executed by the processor and information to be used for processing by the processor. The processor may include a CPU. The CPU executes the program stored in the memory to thereby perform various types of processing.

Figure 5:
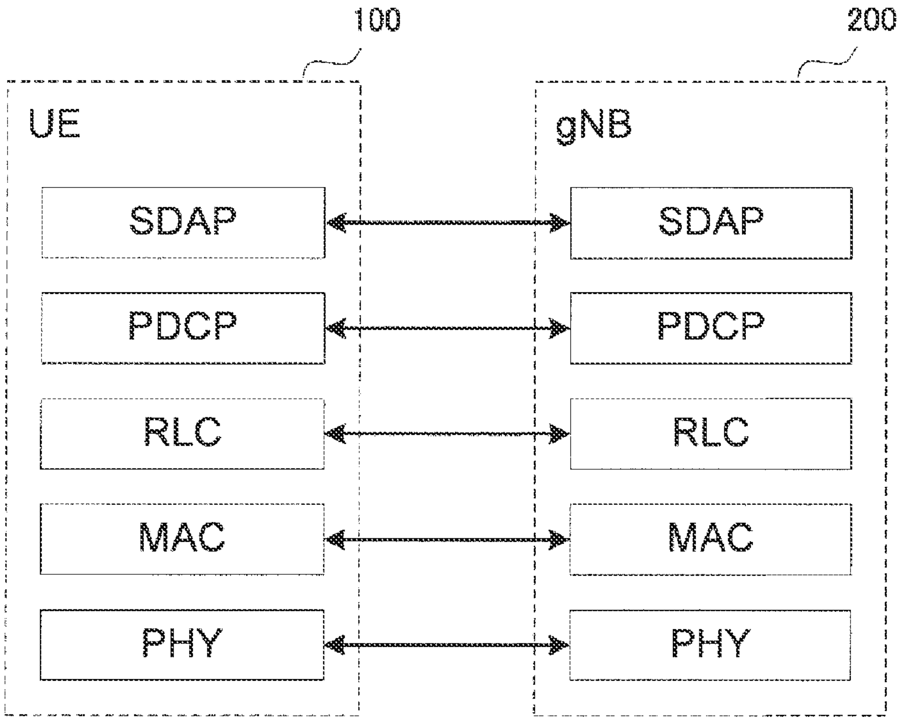
FIG. 5 is a diagram illustrating a configuration of a protocol stack of a radio interface of a user plane handling data.

FIG. 5 is a diagram illustrating a configuration of a protocol stack of a radio interface of a user plane handling data.

The radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, Modulation and Coding Schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression/decompression, encryption/decryption, and the like.

The SDAP layer performs mapping between an IP flow as the unit of Quality of Service (QoS) control performed by a core network and a radio bearer as the unit of QoS control performed by an Access Stratum (AS). Note that, when the RAN is connected to the EPC, the SDAP need not be provided.

Figure 6:
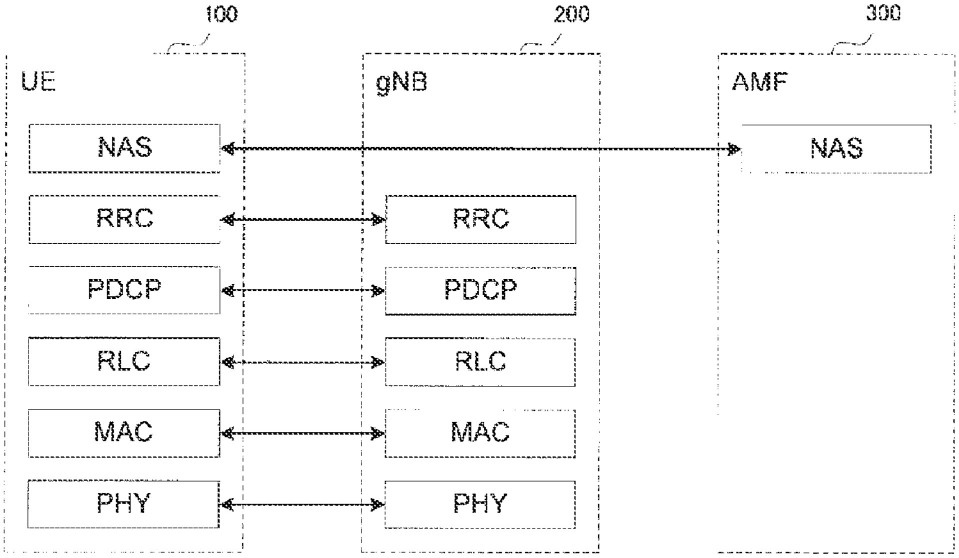
FIG. 6 is a diagram illustrating a configuration of a protocol stack of a radio interface of a control plane handling signaling (control signal).

FIG. 6 is a diagram illustrating a configuration of a protocol stack of a radio interface of a control plane handling signaling (a control signal).

The protocol stack of the radio interface of the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, re-establishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is positioned upper than the RRC layer performs session management, mobility management, and the like. NAS signaling (NAS message) is transmitted between the NAS layer of the UE 100 and the NAS layer of the AMF 300. The NAS message related to the session management may be transferred to a Session Management Function (SMF) via AMF 300. In other words, the UE 100 and the SMF transmit and receive a NAS message related to the session management via the AMF 300. The SMF is a core network apparatus that performs the session management and is connected to the AMF 300.

Note that the UE 100 includes an application layer other than the protocol of the radio interface.

Overview of Network Slicing

An overview of the network slicing is described. The network slicing introduces a technique for virtually dividing a physical network (e.g., a network including the NG-RAN 10 and the 5GC 20) constructed by an operator to creating a plurality of virtual networks. Each virtual network is referred to as a network slice. Hereinafter, a "network slice" may be simply referred to as a "slice".

The network slicing enables a communication operator to create virtual network slices according to service requirements of different service types, such as eMBB, Ultra-Reliable and Low Latency Communications (URLLC), and massive Machine Type Communications (mMTC), so as to optimize network resources.

The slice is defined in a Public Land Mobile Network (PLMN). One slice includes a RAN part and a CN (core network) part. One slice is associated with one PDU session.

Figure 7:
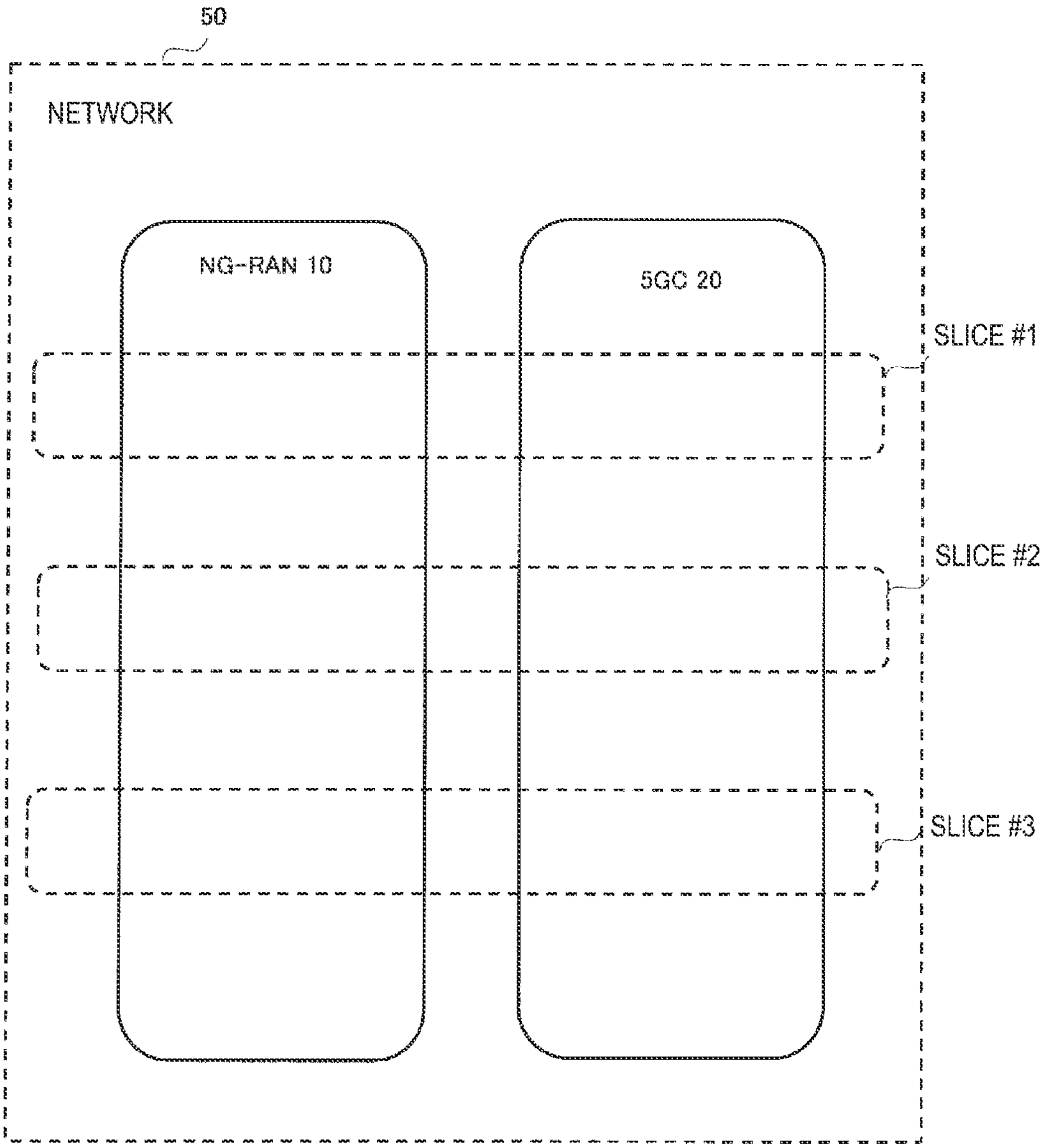
FIG. 7 is a diagram illustrating network slicing according to an embodiment.

FIG. 7 is a diagram illustrating network slicing according to an embodiment. As illustrated in the figure, three slices (slice #1 to slice #3) are created on a network 50 including the NG-RAN 10 and the 5GC 20. The slice #1 is associated with a service type of eMBB, the slice #2 is associated with a service type of URLLC, and the slice #3 is associated with a service type of mMTC. Note that three or more slices may be created on the network 50. One service type may be associated with a plurality slices.

Each slice is provided with a slice identifier for identifying the slice. Examples of the slice identifier include a Single Network Slicing Selection Assistance Information (S-NSSAI). The S-NSSAI includes an 8-bit slice/service type (SST). The S-NSSAI may further include a 24-bit slice differentiator (SD). The SST is information indicating a service type with which a slice is associated. The SD is information for differentiating a plurality of slices associated with the same service type. The information including a plurality of pieces of S-NSSAI is referred to as a Network Slice Selection Assistance Information (NSSAI).

A plurality of slices may be grouped to create a slice group. Each slice group may be provided with a slice group identifier for identifying the slice group. Note that the slice group is different from the NSSAI. The slice group identifier does not include the slice identifier of each slice belonging to the slice group.

Each gNB 200 belonging to the NG-RAN 10 can support a plurality of slices. The gNB 200 may notify the UE 100 of the slice identifier of each slice supported by the gNB 200 in a broadcast RRC message (e.g., System Information Block (SIB) 1) or an individual RRC message (e.g., RRCRelease message). The gNB 200 may notify the AMF 300 of the slice identifier of each slice supported by the gNB 200 in an NGAP message. The gNB 200 may notify a neighboring gNB 200 of the slice identifier of each slice supported by the gNB 200 in an XnAP message.

Each gNB 200 can support a plurality of slice groups. The gNB 200 may notify the UE 100 of the slice group identifier of each slice group supported by the gNB 200 through a broadcast RRC message (e.g., SIB1) or an individual RRC message (e.g., RRCRelease message). The gNB 200 may notify the AMF 300 of the slice group identifier of each slice group supported by the gNB 200 in an NGAP message. The gNB 200 may notify the neighboring gNB 200 of the slice group identifier of each slice group supported by the gNB 200 in an XnAP message.

Each AMF 300 belonging to the 5GC 20 may support a plurality of slices. The AMF 300 may inform the gNB 200 of the slice identifier of each slice supported by the AMF 300 in an NGAP message.

Each AMF 300 may support a plurality of slice groups. The AMF 300 may notify the gNB 200 of the slice group identifier of each slice group supported by the AMF 300 in an NGAP message.

A NAS procedure for communication using a slice is described.

(1) Registration Procedure

Figure 8:
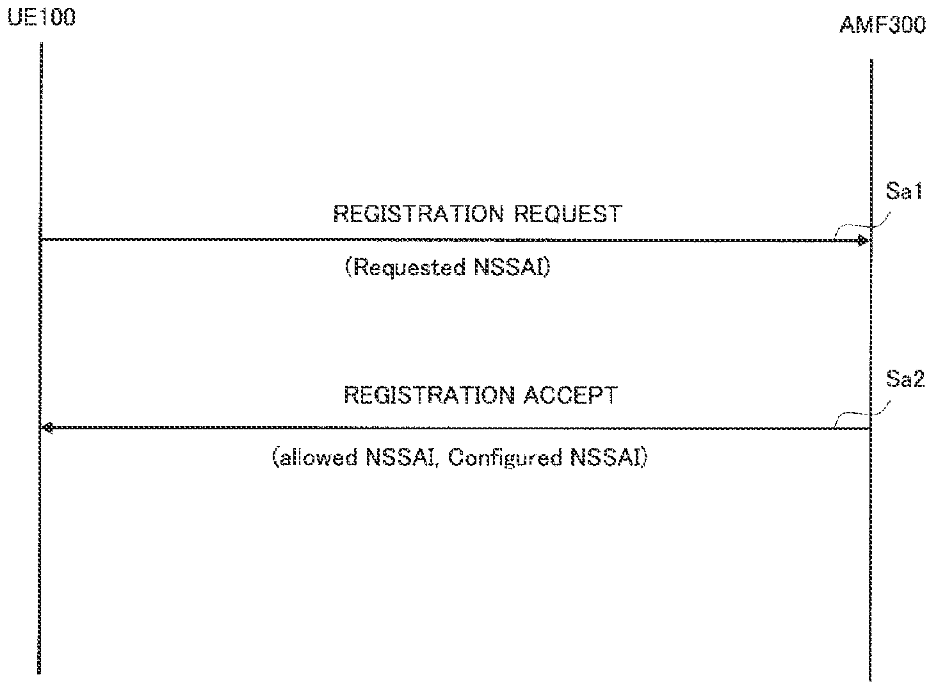
FIG. 8 is a diagram illustrating a Registration procedure according to an embodiment.

A Registration procedure is a procedure for the UE 100 to perform initial registration with the network 50. For example, a Tracking Area (TA) and a Registration Area (RA) are configured for the UE 100 from the AMF 300 in this procedure. FIG. 8 is a diagram illustrating the Registration procedure.

As illustrated in FIG. 8, in step Sa1, the UE 100 transmits a NAS message called a REGISTRATION REQUEST message to the AMF 300. In step Sa2, the AMF 300 transmits a NAS message called a REGISTRATION ACCEPT message to the UE 100. Here, the REGISTRATION REQUEST message may include an information element (IE) "Requested NSSAI". The "Requested NSSAI" is NSSAI (i.e., one or more slices) that the UE 100 wishes to register. The REGISTRATION ACCEPT message may include an IE "allowed NSSAI" and an IE "Configured NSSAI". The "Configured NSSAI" is NSSAI configured for the UE 100 by each PLMN. Note that the "allowed NSSAI" and the "Configured NSSAI" can be updated by a NAS message called a CONFIGURATION UPDATE COMMAND message transmitted from the AMF 300 to the UE 100.

(2) PDU Session Establishment Procedure

Figure 9:
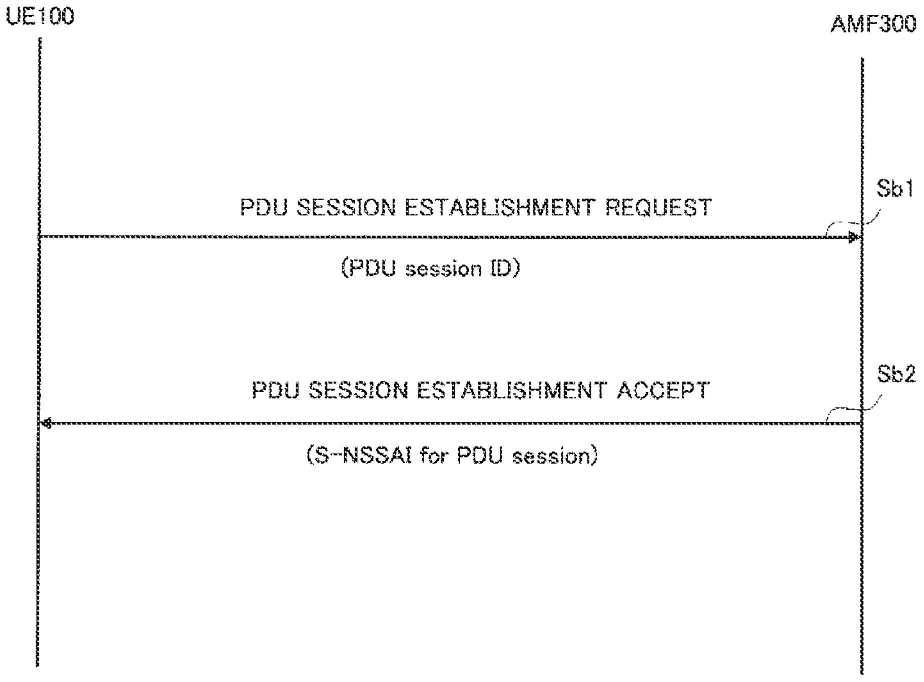
FIG. 9 is a diagram illustrating a PDU session establishment procedure according to an embodiment.

A PDU session establishment procedure is a procedure for establishing a PDU session. FIG. 9 is a diagram illustrating the PDU session establishment procedure. As illustrated in FIG. 9, in step Sb1, the UE 100 transmits a NAS message called a PDU SESSION ESTABLISHMENT REQUEST to the AMF 300. In step Sb2, the AMF 300 transmits a NAS message called a PDU SESSION ESTABLISHMENT ACCEPT message to the UE 100. Here, the PDU SESSION ESTABLISHMENT REQUEST message includes an identifier of a PDU session that the UE 100 wishes to establish. The PDU SESSION ESTABLISHMENT REQUEST message may include a slice (S-NSSAI) that the UE 100 wishes for the PDU session. The PDU SESSION ESTABLISHMENT ACCEPT message may include a slice associated with the UE 100 requested PDU session (the AMF 300 determined slice).

(3) De-Registration Procedure

Figure 10:
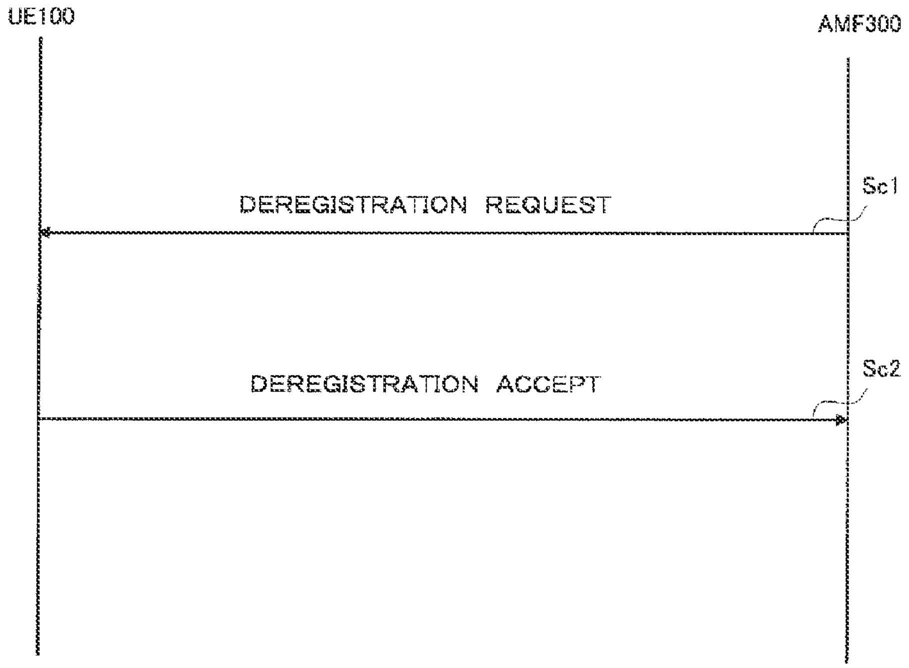
FIG. 10 is a diagram illustrating a De-registration procedure according to an embodiment.

A De-registration procedure is a procedure for notifying the UE 100 from the AMF 300 that the registration with the network 50 is canceled. FIG. 10 is a diagram illustrating the De-registration procedure. As illustrated in FIG. 10, in step Sc1, the AMF 300 transmits a NAS message called a DEREGISTRATION REQUEST message to the UE 100. In step Sc2, the UE 100 transmits a NAS message called a DEREGISTRATION ACCEPT message to the AMF 300.

NGAP Procedure for Communication Utilizing Slice

An NGAP procedure for communication utilizing a slice is described.

(1) NG Setup Procedure

An NG Setup procedure is a procedure for exchanging application level configuration data required to enable the gNB 200 and the AMF 300 to properly interoperate on the NG-C interface.

Figure 11:
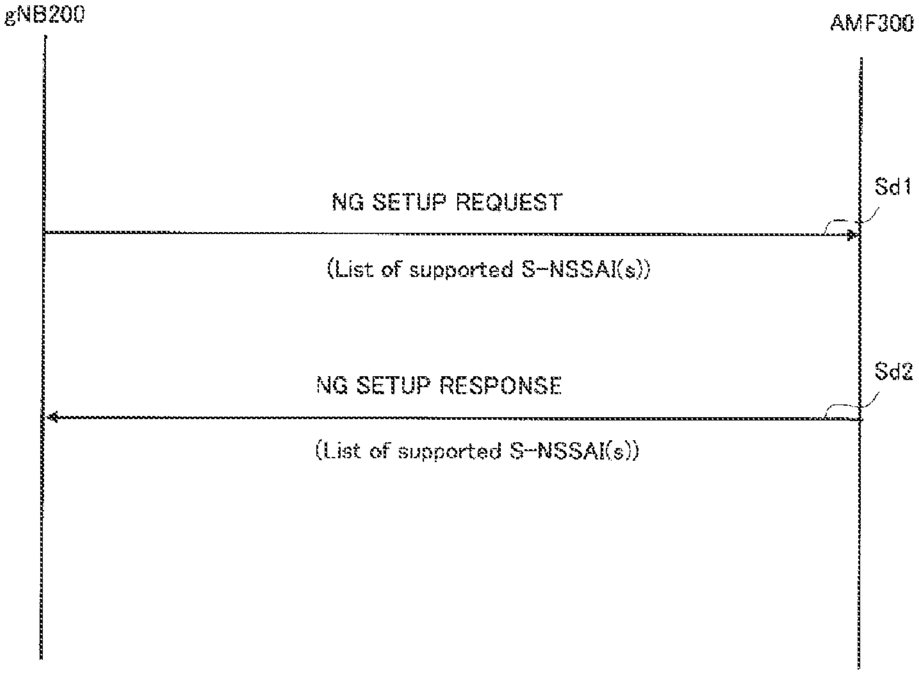
FIG. 11 is a diagram illustrating an NG Setup procedure according to an embodiment.

FIG. 11 is a diagram illustrating the NG Setup procedure. As illustrated in FIG. 11, in step Sd1, the gNB 200 transmits to AMF 300 an NGAP message called an NG SETUP REQUEST message containing the application level configuration data determined by the gNB 200. In step Sd2, the AMF 300 transmits to the gNB 200 an NGAP message called an NG SETUP RESPONSE message containing the application level configuration data determined by the AMF 300. Here, the NG SETUP REQUEST message may include a list of slices supported by the gNB 200 (List of supported S-NSSAI(s)). This list may be a list for each TA. This list may be a list for each PLMN. The NG SETUP RESPONSE message may include a list of slices supported by the AFM 300 (List of supported S-NSSAI(s)). This list may be a list for each TA. This list may be a list for each PLMN.

(2) RAN Configuration Update Procedure

A RAN Configuration Update procedure is a procedure for updating the application level configuration data by the gNB 200.

Figure 12:
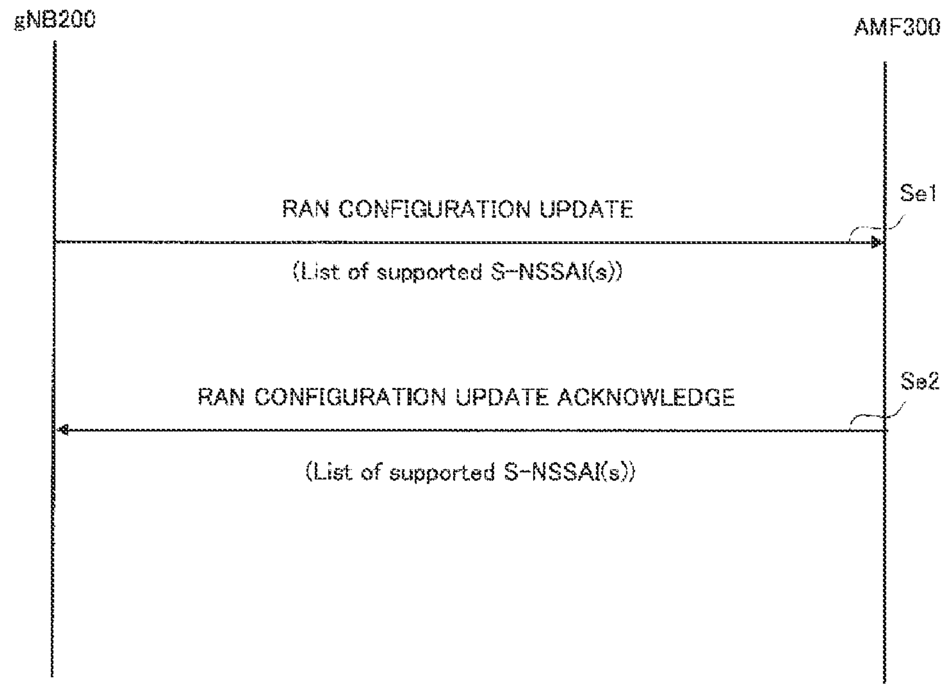
FIG. 12 is a diagram illustrating a RAN Configuration Update procedure according to an embodiment.

FIG. 12 is a diagram illustrating the RAN Configuration Update procedure. As illustrated in FIG. 12, in step Se1, the gNB 200 transmits to the AMF 300 an NGAP message called a RAN CONFIGURATION UPDATE message including the application level configuration data updated by the gNB 200. In step Se2, the AMF 300 transmits to the gNB 200 an NGAP message called a RAN CONFIGURATION UPDATE ACKNOWLEDGE message to acknowledge that the configuration data has been successfully updated. Here, the RAN CONFIGURATION UPDATE message may include a list of slices supported by the gNB 200 (List of supported S-NSSAI(s)).

(3) AMF Configuration Update Procedure

An AMF Configuration Update procedure is a procedure for updating the application level configuration data by the AMF 300.

Figure 13:
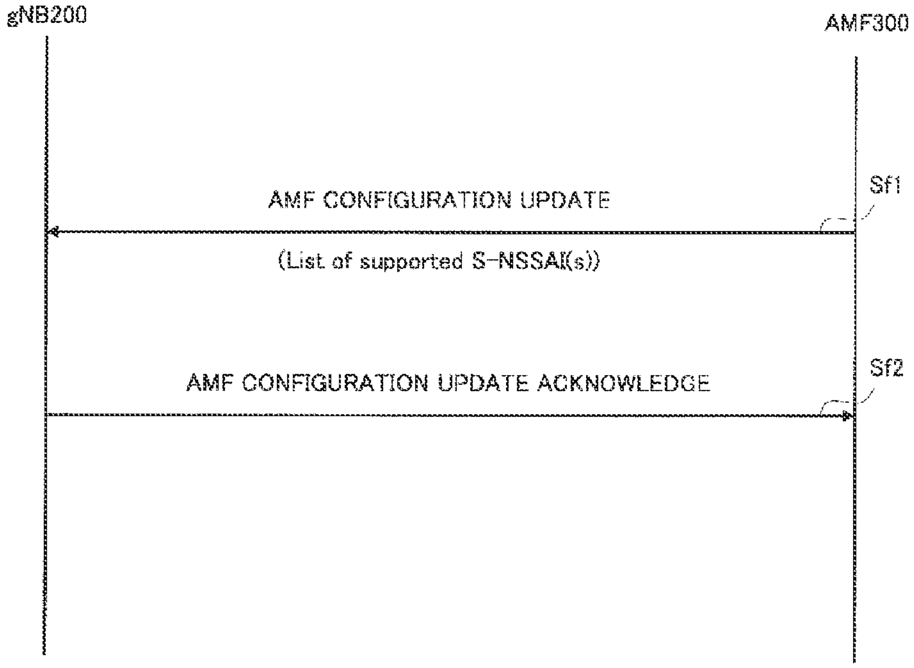
FIG. 13 is a diagram illustrating an AMF Configuration Update procedure according to an embodiment.

FIG. 13 is a diagram illustrating the AMF Configuration Update procedure. As illustrated in FIG. 13, in step Sf1, the AMF 300 transmits to the gNB 200 an NGAP message called an AMF CONFIGURATION UPDATE message including the application level configuration data updated by the AMF 300. In step Sf2, the gNB 200 transmits to the AMF 300 an NGAP message called an AMF CONFIGURATION UPDATE ACKNOWLEDGE message to acknowledge that the configuration data has been successfully updated. Here, the AMF CONFIGURATION UPDATE message may include a list of slices supported by the AMF 300 (List of supported S-NSSAI(s)).

(4) Initial Context Setup Procedure

An Initial Context Setup procedure is a procedure for establishing an initial UE context of a specific the UE 100 in the gNB 200. Such initial UE context may include, for example, a PDU session context, a security key, a mobility restriction list, a UE radio capability, a UE security capability, or the like.

Figure 14:
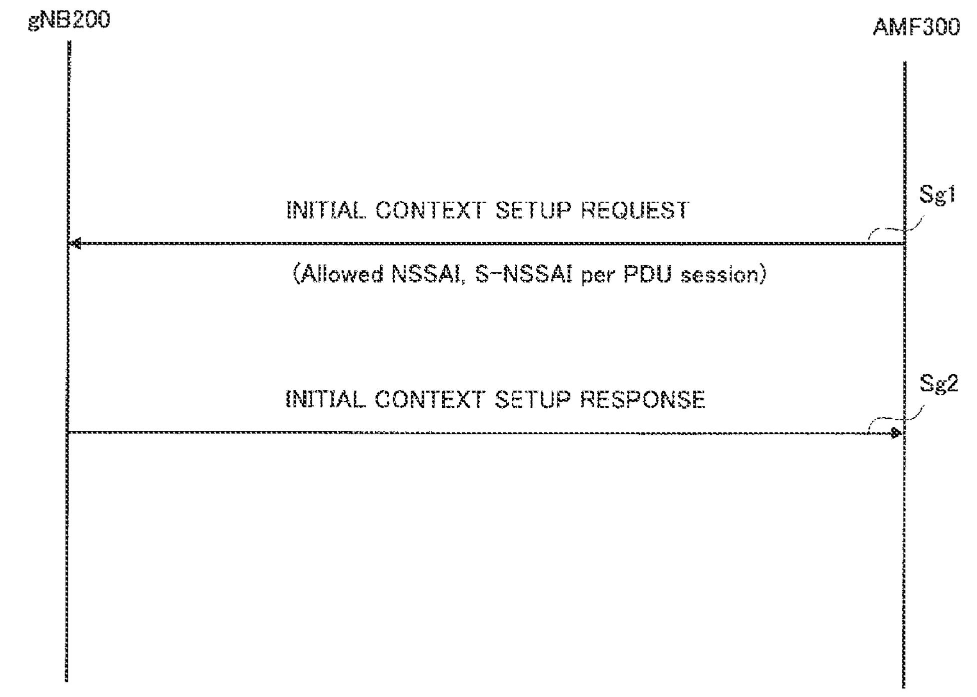
FIG. 14 is a diagram illustrating an Initial Context Setup procedure according to an embodiment.

FIG. 14 is a diagram illustrating the Initial Context Setup procedure. As illustrated in FIG. 14, in step Sg1, the AFM 300 transmits an NGAP message called an INITIAL CONTEXT SETUP REQUEST message to the gNB 200. In step Sg2, the gNB 200 transmits an NGAP message called an INITIAL CONTEXT SETUP RESPONSE message to the AMF 300. Here, the INITIAL CONTEXT SETUP REQUEST message may include "Allowed NSSAI". The "Allowed NSSAI" indicates one or more slices available to the UE 100 in the serving PLMN for the current Registration Area (RA). The INITIAL CONTEXT SETUP REQUEST message may include a set of an identifier of a PDU session and a slice identifier of a slice associated with the PDU session.

(5) PDU Session Resource Setup Procedure

A PDU Session Resource Setup procedure is a procedure for assigning resources (PDU Session Resources) on the Uu and NG-U interfaces for one or more PDU sessions for a specific UE 100. The PDU Session Resource Setup procedure may be initiated in response to the PDU Session Establish procedure described above.

Figure 15:
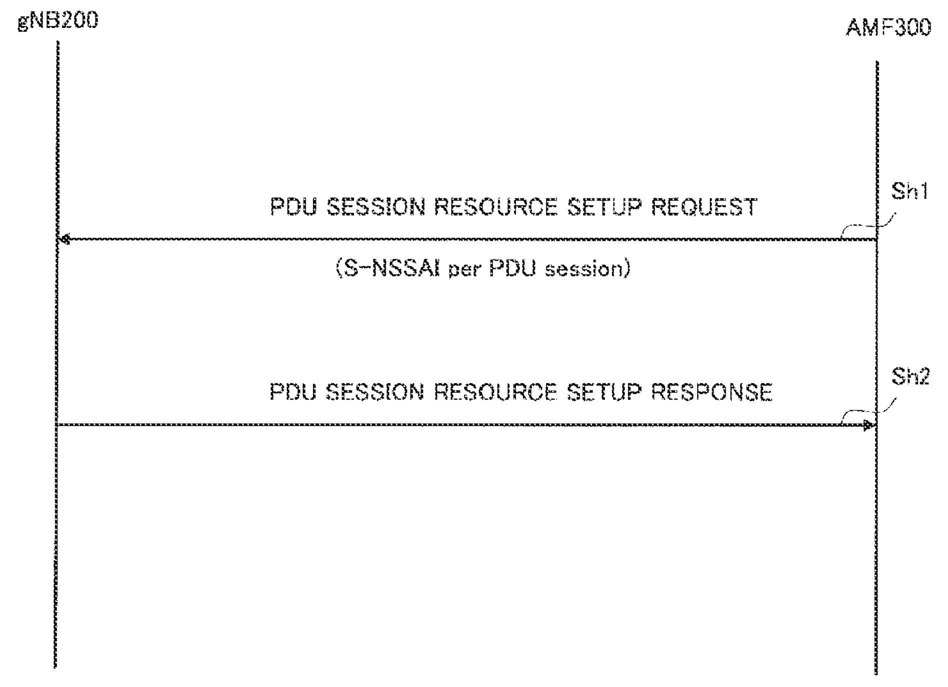
FIG. 15 is a diagram illustrating a PDU Session Resource Setup procedure according to an embodiment.

FIG. 15 is a diagram illustrating the PDU Session Resource Setup procedure. As illustrated in FIG. 15, in step Sh1, the AMF 300 transmits an NGAP message called a PDU SESSION RESOURCE SETUP REQUEST message to the gNB 200. In step Sh2, the gNB 200 transmits an NGAP message called a PDU SESSION RESOURCE SETUP RESPONSE message to the AMF 300. Here, the PDU SESSION RESOURCE SETUP REQUEST message includes a set of an identifier of a PDU session and a slice identifier of a slice associated with the PDU session.

(6) PDU Session Resource Modify Procedure

A PDU Session Resource Modify procedure is a procedure for enabling configuration modification of one or more PDU sessions that are already established for a specific UE 100.

Figure 16:
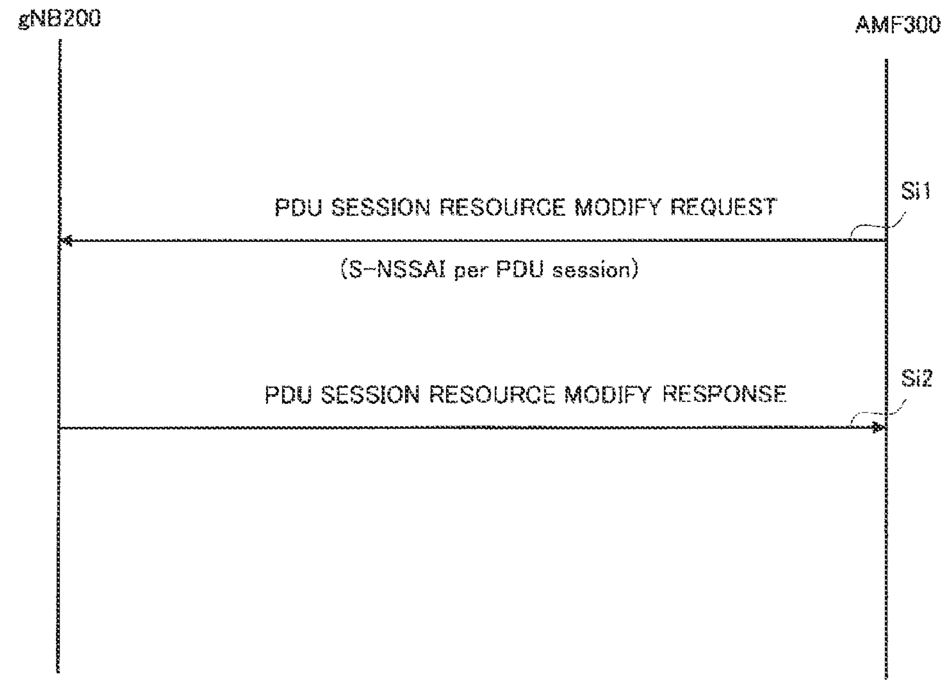
FIG. 16 is a diagram illustrating a PDU Session Resource Modify procedure according to an embodiment.

FIG. 16 is a diagram illustrating the PDU Session Resource Modify procedure. As illustrated in FIG. 16, in step Si1, the AMF 300 transmits an NGAP message called a PDU SESSION RESOURCE MODIFY REQUEST message to the gNB 200. In step Si2, the gNB 200 transmits an NGAP message called a PDU SESSION RESOURCE MODIFY RESPONSE message to the AMF 300. Here, the PDU SESSION RESOURCE MODIFY REQUEST message includes a set of an identifier of a PDU session and a slice identifier of a slice associated with the PDU session.

(7) PDU Session Resource Release Procedure

A PDU Session Resource Release procedure is a procedure for releasing the resource of the PDU session already established for a specific UE 100.

Figure 17:
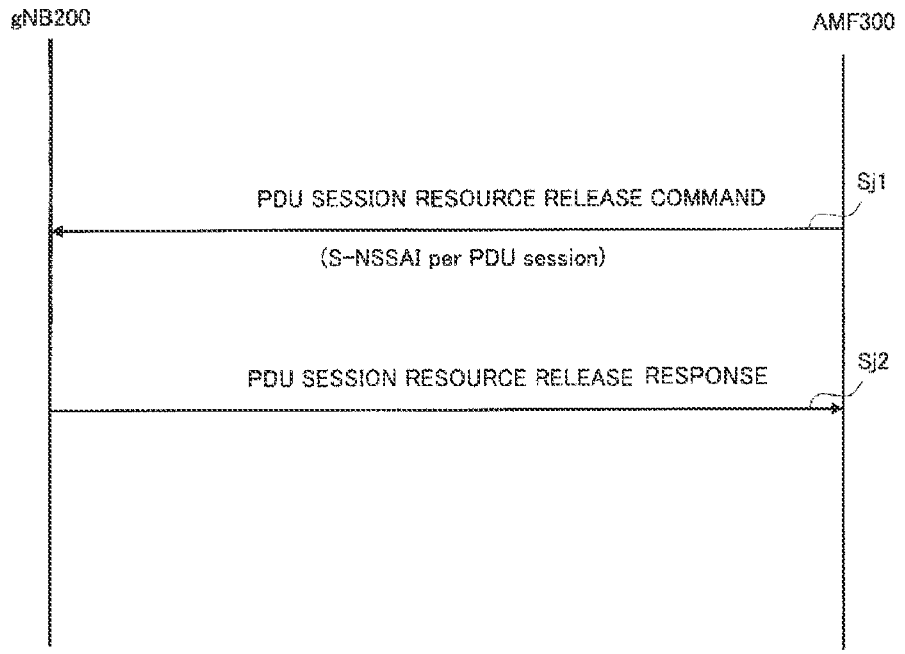
FIG. 17 is a diagram illustrating a PDU Session Resource Release procedure according to an embodiment.

FIG. 17 is a diagram illustrating the PDU Session Resource Release procedure. As illustrated in FIG. 17, in step Sj1, the AMF 300 transmits an NGAP message called a PDU SESSION RESOURCE RELEASE COMMAND message to the gNB 200. In step Sj2, an NGAP message called a PDU SESSION RESOURCE RELEASE RESPONSE message is transmitted to the AMF 300.

Regarding Restriction on Slice

Restriction on a slice is described.

In an embodiment, the AMF 300 or the gNB 200 may restrict at least one slice among slices supported thereby. Restricting a slice means determining a restrictive condition that is a condition for restricting use of the slice. Hereinafter, a slice for which a restrictive condition is determined may be referred to as a "restrictive slice".

The restrictive condition includes at least one selected from the group consisting of (1) a time condition, (2) a UE location condition, (3) a UE group condition, and (4) a RAN condition.

The restrictive condition determined for one slice may be one of the conditions (1) to (4) described above. The restrictive condition may be a combination of two or more of the conditions (1) to (4). The combined condition may be a condition combined by "AND". The combined condition may be a condition combined by "OR". A condition obtained by combining two or more conditions by "AND" is a condition of which all of the two or more conditions are to be satisfied. A condition obtained by combining two or more conditions by "OR" is a condition of which any one of the two or more conditions is to be satisfied.

The above-described (1) time condition, (2) UE location condition, (3) UE group condition, and (4) RAN condition are described in detail.

(1) Time Condition

The time condition is a condition for specifying a time slot or period during which the use of the slice is restricted. As an example, when resources for a certain slice are exhausted, the AMF 300 (or the gNB 200) may determine a predetermined period of time (e.g., three hours) as a time condition for the slice. As another example, the AMF 300 (or the gNB 200) predicts a time slot in which resources for a certain slice are likely to be exhausted, based a traffic situation of the slice, and determines the predicted time slot (e.g., 18:00 to 22:00) as the time condition.

(2) UE Location Condition

The UE location condition is a condition for specifying a geographic location of the UE 100 for which the use of the slice is restricted. The use of the slice is restricted for the UE 100 that is located at a geographic location specified by the UE location condition. The UE location condition specifies at least one selected from the group consisting of a longitude range, a latitude range, and an altitude range as the geographic location.

For example, the gNB 200 determines the UE location condition based on a geographic coverage range of the cell the gNB 200 manages.

(3) UE Group Condition

The UE group condition specifies a UE group for which the use of the slice is restricted. The use of the slice is restricted for the UE 100 belonging to a UE group specified by the UE group condition. Here, the UE group may be specified by means of a Ran Notification Area (RNA), a Tracking Area (TA), a Registration Area (RA), a group identifier, or a plurality of UE identifiers. The UE group specified by means of the RNA is a group including all UEs 100 where the RNA is configured. The UE group specified by means of the TA is a group including all UEs 100 where the TA is configured. The UE group specified by means of the RA is a group including all UEs 100 where the RA is configured. Note that the UE group may include only one UE 100. The UE group condition may specify a single UE 100 (a UE identifier of the UE 100) for which the use of the slice is restricted.

The RNA is an area for the gNB 200 to page the UE 100 is in the RRC inactive state. The RNA includes one or more cells. The RNA is part of the TA. The RNA is configured for the UE 100 by the gNB 200.

The TA is an area for the AMF 300 to page the UE 100 is in the RRC idle state. The TA includes a plurality of cells. The TA is configured for the UE 100 by the AMF 300.

The RA is an area managed for each access type (3GPP access or non-3GPP access). The RA includes a plurality of TAs. The RA is configured for the UE 100 by the AMF 300.

The group identifier is an identifier for identifying a group including a plurality of UEs 100. The group identifier is, for example, a Temporary Mobile Group Identity (TMGI) identifying a group including the UE 100 performing group communication such as a Multicast Broadcast Service (MBS).

(4) RAN Condition

The RAN condition is a condition for specifying a carrier frequency or a Radio Access Technology (RAT) for which the use of the slice is restricted. For example, when a certain carrier frequency is congested. the gNB 200 restricts the use of a slice through the certain carrier frequency.

In an embodiment, the AMF 300 determines a restrictive condition that is a condition for restricting use of a network slice. The AMF 300 transmits network slice restriction information related to the network slice to the UE 100 or the gNB 200. The network slice restriction information includes a network slice identifier for identifying the network slice and condition information indicating the restrictive condition. This allows the UE 100 or the gNB 200 to grasp the restrictive condition for the network slice. Therefore, the UE 100 can appropriately judge whether to use a network slice and can suppress unnecessary access to an unusable network slice. The gNB 200 can notify the UE 100 of the restrictive condition.

In an embodiment, the gNB 200 determines a restrictive condition that is a condition for restricting use of a network slice. The gNB 200 transmits restriction information related to restrictive network slice to the AMF 300, another gNB 200, or the UE 100. This allows the AMF 300, the other another gNB 200, or the UE 100 to grasp the restrictive condition for the network slice.

In an embodiment, the UE 100 receives the network slice restriction information related to the network slice on which the restrictive condition is put from the gNB 200 or the AMF 300. The network slice restriction information includes an identifier for identifying the network slice and information indicating the restrictive condition. This allows the UE 100 to appropriately judge whether to avoid using the network slice.

Operation Example 1

In an embodiment, Operation Example 1 is described.

Figure 18:
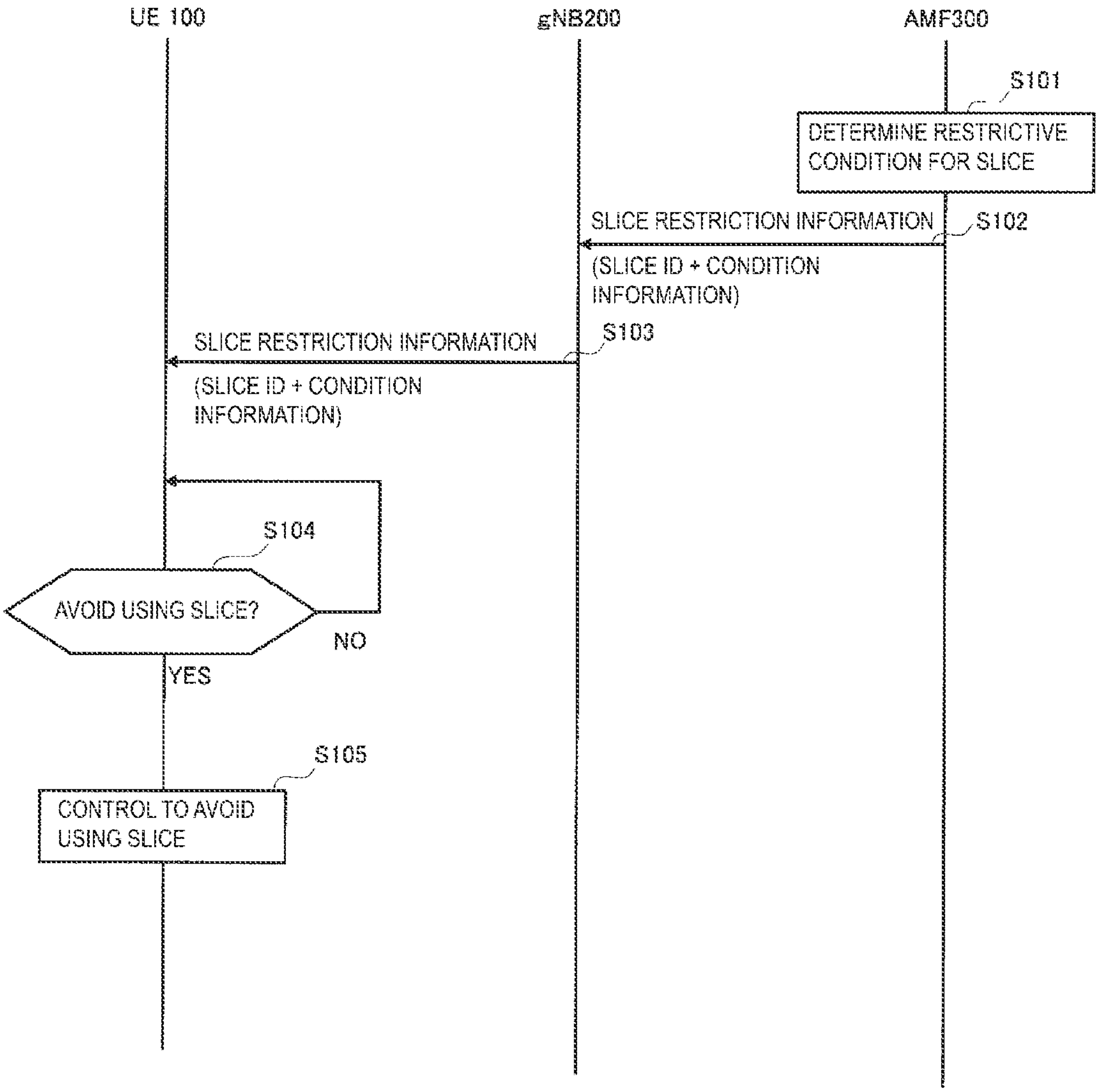
FIG. 18 is a diagram illustrating Operation Example 1 according to an embodiment.

FIG. 18 is a diagram illustrating Operation Example 1. As illustrated in FIG. 18, in step S101, the AMF 300 determines a restrictive condition for at least one of the slices the AMF 300 supports. Hereinafter, a slice for which a restrictive condition is determined may be referred to as a "restrictive slice".

In step S102, the AMF 300 transmits the network slice restriction information to the gNB 200. The gNB 200 receives the network slice restriction information from the AMF 300. Hereinafter, the network slice restriction information may be simply referred to as the slice restriction information.

The slice restriction information includes a set of a slice identifier for identifying the restrictive slice and condition information indicating the restrictive condition corresponding to the restrictive slice. When the AMF 300 determines the restrictive conditions for a plurality of slices, the slice restriction information may include a set of a slice identifier and condition information for each of the plurality of slices.

The AMF 300 may transmit the slice restriction information using an NGAP message. Such an NGAP message may be the above-mentioned NG SETUP RESPONSE message, AMF CONFIGURATION UPDATE message, or the like. Such an NGAP message may be another NGAP message defined in the 3GPP specifications (e.g., 3GPP TS 38.413 V16.1.0).

When the NG SETUP RESPONSE message is used, the AMF 300 may transmit the slice restriction information corresponding to the slice indicated in the List of supported S-NSSAI(s) notified from the gNB 200.

In step S103, the gNB 200B transmits the slice restriction information received from the AMF 300 to the UE 100. The UE 100 receives the slice restriction information from the gNB 200.

The gNB 200 transmits the slice restriction information in an RRC message. The RRC message may be a broadcast RRC message. The RRC message may be an individual RRC message. The broadcast RRC message is, for example, an SIB (SIB1 or other SIGs), an MIB (Master Information Block), or the like. The individual RRC message is, for example, an RRCReconfiguration message, an RRCRelease message, or the like. The RRCReconfiguration message is a message for modifying an RRC connection of the UE 100 in the RRC connected state. The RRCRelease message is a message for transitioning the UE 100 is in the RRC connected state to the RRC idle state or the RRC inactive state.

Note that the RRC layer of the UE 100 may provide the slice restriction information received from the gNB 200 to the NAS layer and/or the application layer of the UE 100.

In step S104, the UE 100 judges whether to avoid using the slice based on the slice restriction information received in step S103. To be more specific, when the restrictive condition indicated by the condition information is satisfied, the UE 100 judges to avoid using the slice corresponding to the condition information. For example, when the condition information indicates the time condition as the restrictive condition, the UE 100 judges to avoid using slice in the time slot or period specified in the time condition. When the condition information indicates the UE location condition as the restrictive condition, the UE 100 judges to avoid using the slice when the UE 100 is located at the geographic location specified in the UE location condition. When the condition information indicates the UE group condition as the restrictive condition, the UE 100 judges to avoid using the slice when the UE 100 belongs to the UE group specified in the UE group condition. When the condition information indicates the RAN condition as the restrictive condition, the UE 100 judges to avoid using the slice when the UE 100 uses the carrier frequency and/or the RAT specified in the RAN condition.

Note that the judgment of whether to avoid using the slice may be performed in the RRC layer of the UE 100. Furthermore, the judgment may be performed in the NAS layer of the UE 100. For example, the NAS layer of the UE 100 may make the judgment based on the slice restriction information shared by the RRC layer. In this case, the judgment result may be shared by the RRC layer and the NAS layer. The judgment may be made in the application layer of the UE 100 or by a user of the UE 100. In this case, the judgment result may be shared by the RRC layer, the NAS layer, the application layer, and the user. The judgment may be made in the Access Stratum (AS) layer including the RRC layer. The AS layer includes the PHY layer, the MAC layer, the RLC layer, the PDCP layer, and the RRC layer, for example.

When the UE 100 judges to avoid using the slice (step S104: YES), the UE 100 performs control to avoid using the slice in step S105.

A concrete example of control in which the UE 100 avoids using the slice #1, taken as an example, is described.

First example: The UE 100 (in the RRC idle/inactive state), when performing cell selection or cell reselection, performs control to decrease a priority of a cell supporting the slice #1 or exclude the cell from selection candidate cells. As a result, the UE 100 is less likely to select the cell supporting the slice #1, which can reduce unnecessary access to the cell for the slice #1.

Second example: The UE 100 (in the RRC connected state) does not request the slice #1 when performing the Registration procedure. This can reduce unnecessary signaling due to the request for the slice #1 (e.g., signaling in which the AMF 300 rejects the registration request due to the request for the slice #1).

Third example: The UE 100 (in the RRC connected state) does not request establishment of a PDU session associated with the slice #1 when performing the PDU Session Establishment procedure. This can reduce unnecessary signaling due to the request for the slice #1 (e.g., signaling in which the AMF 300 rejects the PDU establishment request due to the request for the slice #1).

In Operation Example 1, the UE 100 may start using the slice when the restrictive condition indicated by the condition information received in step S103 is no longer satisfied in performing control to avoid using the slice. For example, when the UE 100 receives the time condition indicating the period of "three hours" as the restrictive condition for the slice #1, the UE 100 starts a timer (timer value=three hours) that measures the period and performs control to avoid using the slice #1. When the timer expires, the UE 100 judges that the restrictive condition is no longer satisfied and starts using the slice #1.

A concrete example in which the UE 100 starts using the slice #1, taken as an example, is described.

First example: The UE 100 (in the RRC idle/inactive state), when performing cell selection or cell reselection, increases a priority of a cell supporting the slice #1.

Second example: The UE 100 (in the RRC connected state) requests the slice #1 when performing the Registration procedure.

Third example: The UE 100 (in the RRC connected state) requests establishment of a PDU session associated with the slice #1 when performing the PDU Session Establishment procedure.

In Operation Example 1, the UE 100 may receive a notification from the gNB 200 or the AMF 300 indicating that the restrictive condition corresponding to the restrictive slice is to be canceled in performing control to avoid using the slice. In response to receiving such a notification, the UE 100 may start using the slice.

In Operation Example 1, in step S102, the gNB 200 may transmit to the UE 100 not the slice restriction information received from the AMF 300 but the slice restriction information including the restrictive condition determined by the gNB 200 itself.

Operation Example 2

In an embodiment, Operation Example 2 is described. A description is given mainly on differences from the operation example described above.

Figure 19:
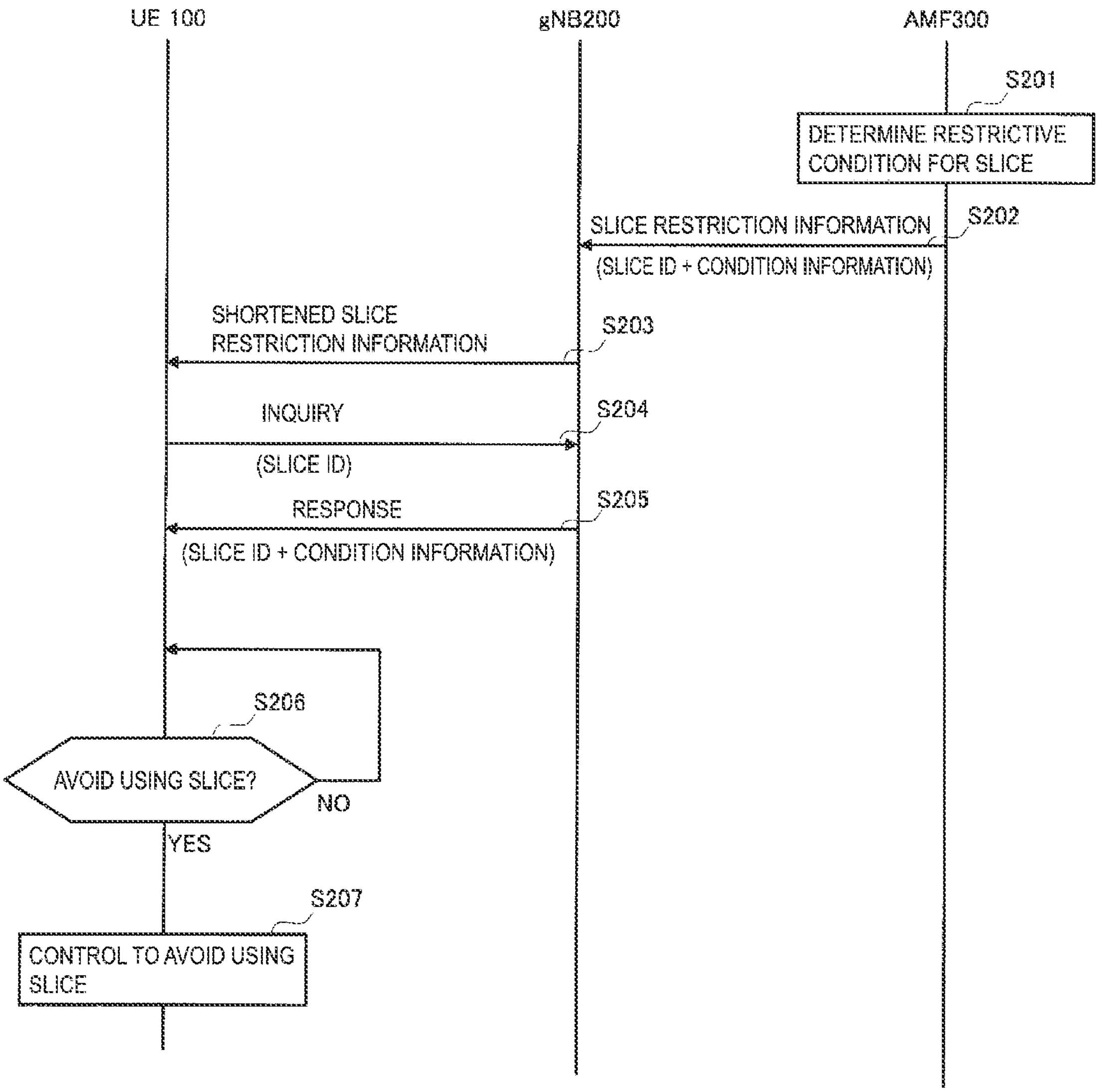
FIG. 19 is a diagram illustrating Operation Example 2 according to an embodiment.

FIG. 19 is a diagram illustrating Operation Example 2. As illustrated in FIG. 19, operations in steps S201 and S202 are the same as, and/or similar to, the operations in steps S101 to S102.

In step S203, the gNB 200 transmits shortened slice restriction information to the UE 100. Here, the “shortened slice restriction information” has a smaller amount of information than the “slice restriction information” transmitted in step S103. For example, when an upper limit is configured for a data amount that can be transmitted through the SIB1 and a large amount of information is difficult to be included in the SIB1, the gNB 200 broadcasts the SIB1 including the shortened slice restriction information instead of the slice restriction information.

The shortened slice restriction information may be a flag indicating that the restrictive condition is set for at least one slice among the slices supported by the gNB 200. The UE 100 receiving such shortened information can grasp that the restrictive condition is set for the slice supported by the gNB 200 but cannot grasp what restrictive condition is set for which slice. Note that “a restrictive condition is set for a slice” means that the AMF 300 or the gNB 200 determines a restrictive condition for a slice.

The shortened slice restriction information may include a slice identifier of the slice for which the restrictive condition is set and a flag indicating that the restrictive condition is set for the slice. The UE 100 receiving such shortening information can grasp the slice for which the restrictive condition is set but cannot grasp what restrictive condition is set for the slice.

The shortened slice restriction information may include a slice group identifier for identifying a slice group for which the restrictive condition is set and a flag indicating that the restrictive condition is set for the slice group. The UE 100 receiving such shortened slice restriction information can grasp the slice group for which the restrictive condition is set but cannot grasp what restrictive condition is set for the slice group.

When a slice desired by the UE 100 exists among slices supported by the gNB 200, the UE 100 that has received the shortened slice restriction information needs to transmit an inquiry for acquiring a restrictive condition to the gNB 200 or the AMF 300, in order to appropriately judge whether to avoid using the slice.

In step S204, the UE 100 transmits an inquiry to the gNB 200 for acquiring restrictive condition. The inquiry includes information identifying a target slice of the inquiry. The number of target slices may be one, or two or more. The target slice may be a slice group. In step S205, the gNB 200 transmits slice restriction information as a response to the inquiry to the UE 100. The UE 100 receives the slice restriction information from the gNB 200. The slice restriction information includes a set of a slice identifier of the target slice of the inquiry and condition information indicating the restrictive condition.

For the UE 100 in the RRC idle state or the RRC inactive state, transmitting an inquiry and a response may be performed by using a message in the random access procedure. By doing so, the UE 100 can receive the response (slice restriction information) from the gNB 200 without transitioning to the RRC connected state and can reduce power consumption caused by transitioning to the RRC connected state.

For the UE 100 in the RRC idle state or the RRC inactive state, the message used for transmitting the inquiry may be Message 1 (MSG1) or Message 3 (MSG3) in 4-step random access procedure. The message used for transmitting the inquiry may be Message A (MSGA) in 2-step random access procedure. The message used for transmitting the response may be Message 4 (MSG4) in the 4-step random access procedure. The message used for transmitting the response may be Message B (MSGB) in the 2-step random access procedure. The MSGA is a message into which the MSG1 and the MSG3 are combined. The MSGB is a message into which the MSG2 and the MSG4 are combined.

The MSG1 is a random access preamble transmitted from the UE 100 to the gNB 200. The MSG2 is a response to the random access preamble and includes a transmission resource for the MSG3 scheduled by the gNB 200. The MSG3 is the first scheduled transmission in the random access procedure. The MSG3 is, for example, an RRCSetupRequest message for establishing an RRC connection, an RRCResumeRequest message for resuming an RRC connection, an RRCReestablishmentRequest message for re-establishing an RRC connection, or the like. The MSG3 may be a message dedicated to an inquiry for acquiring a restrictive condition. The MSG4 is a response to the MSG3, and is, for example, an RRCSetup message for establishing an RRC connection, an RRCResume message for resuming an RRC connection, an RRCReestablishment message for re-establishing an RRC connection, or the like. The MSG4 may be a message dedicated to a response to an inquiry for acquiring a restrictive condition.

Transmitting an inquiry using the MSG1 means transmitting, by the UE 100, a random access preamble associated with the target slice of the inquiry. The association between the random access preamble and the slice may be notified from the gNB 200 to the UE 100 through the SIB1.

Transmitting an inquiry by using the MSG3 is transmitting, by the UE 100, the slice identifier of the target slice of the inquiry included in the MSG3.

Transmitting a response (slice restriction information) using the MSG4 is transmitting, by the gNB 200, the MSG4 including the response.

For the UE 100 in the RRC connected state, transmitting an inquiry is performed using, for example, a UEAssistanceInformation message. Transmitting a response is performed using, for example, an RRCReconfiguration message.

Operations in steps S206 to S207 are the same as, and/or similar to, the operation in steps S104 to S105.

In Operation Example 2, the UE 100 in the RRC connected state may transmit an inquiry to the AMF 300 using a NAS message. The UE 100 may receive a response to the inquiry transmitted in the NAS message from the AMF 300. Here, the NAS message used for transmitting the inquiry is, for example, a REGISTRATION REQUEST message, a PDU SESSION ESTABLISHMENT REQUEST message, or the like. The NAS message used for transmitting the response to the inquiry is, for example, a REGISTRATION ACCEPT message, a PDU SESSION ESTABLISHMENT RESPONSE message, or the like.

In Operation Example 2, the gNB 200 may transmit the shortened slice restriction information to the UE 100 by using unified access control (UAC) defined in the existing specifications. In the existing specifications (e.g., 3GPP TS 38.300 V16.1.0 and 3GPP TS 38.331 V16.1.0), the gNB 200 broadcasts a barring parameter associated with each access category (AC) as the UAC through the SIB1. In the existing specification, 64 ACs #0 to #63 are defined. Among these ACs, ACs #0 to #10 are defined as standard ACs, and ACs #32 to #63 are defined as operator-defined ACs. The gNB 200 may use the operator-defined AC to transmit the shortened slice restriction information (e.g., a slice identifier of a restrictive slice). By doing so, the gNB 200 can notify the UE 100 of the shortened slice restriction information without changing the existing specifications. Note that the gNB 200 may transmit the shortened slice restriction information by using the standard AC.

Operation Example 3

In an embodiment, Operation Example 3 is described. A description is given mainly on differences from the operation example described above.

Figure 20:
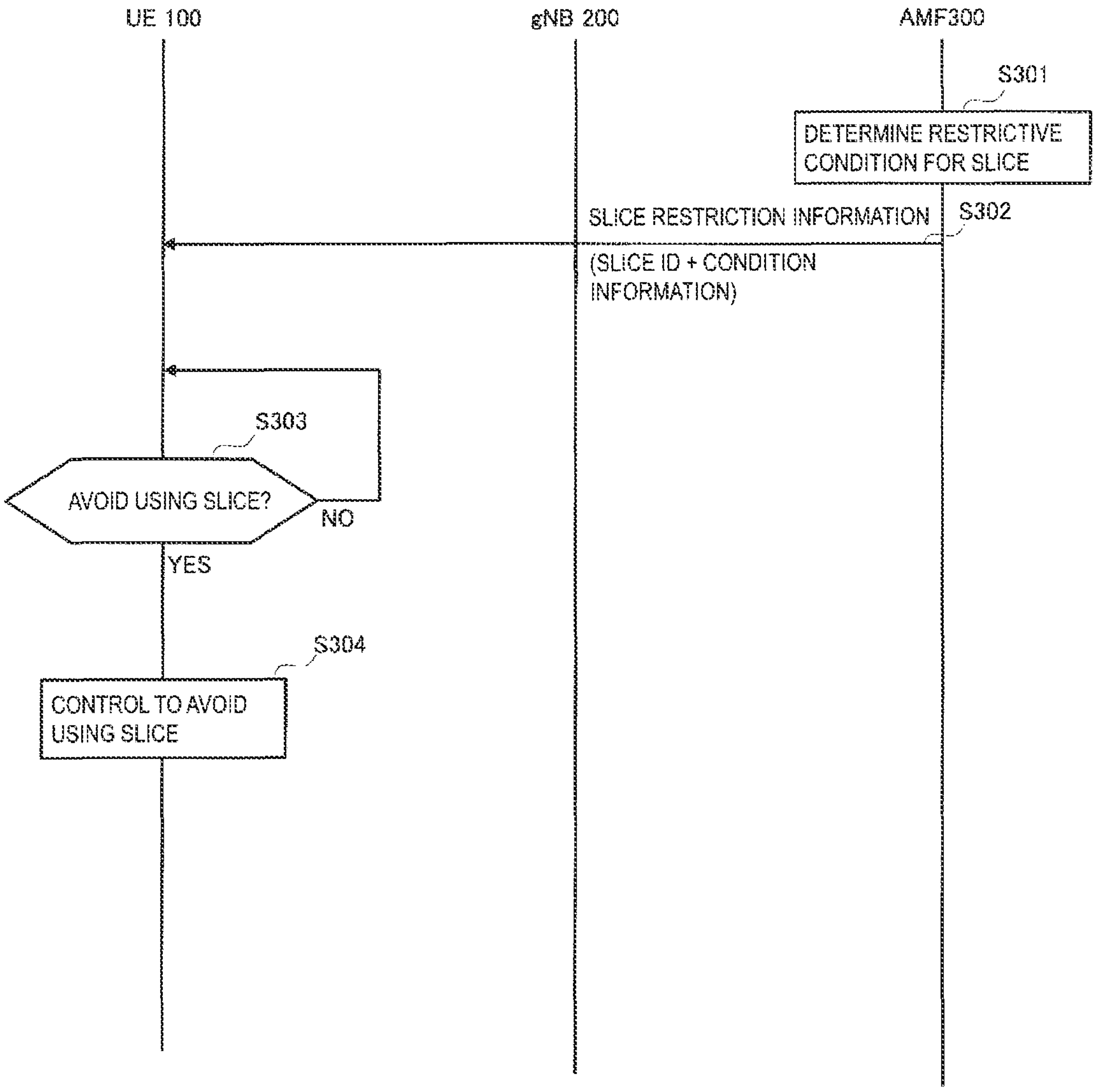
FIG. 20 is a diagram illustrating Operation Example 3 according to an embodiment.

FIG. 20 is a diagram illustrating Operation Example 3. As illustrated in FIG. 20, an operation in step S301 is the same as, and/or similar to, the operation in step S101.

In step S302, the AMF 300 transmits the slice restriction information to the UE 100. The UE 100 receives the slice restriction information from the AMF 300.

The AMF 300 may transmit the slice restriction information using an NAS message. Such an NAS message is, for example, the above-mentioned REGISTRATION ACCEPT message, CONFIGURATION UPDATE COMMAND message, DE-REGISTRATION REQUEST message, or the like. Such an NAS message may be another NAS message defined in the 3GPP specifications (e.g., 3GPP TS 24.501 V16.1.0).

When using the REGISTRATION ACCEPT message, the AMF 300 may transmit the slice restriction information corresponding to a slice requested by the UE 100 (Requested NSSAI).

When using the REGISTRATION ACCEPT message, the AMF 300 may transmit the slice restriction information corresponding to a slice included in the "allowed NSSAI" and/or the "Configured NS SAI".

Operations in steps S303 to S304 are the same as, and/or similar to, the operation in steps S104 to S105.

Operation Example 4

In an embodiment, Operation Example 4 is described. A description is given mainly on differences from the operation example described above.

Figure 21:
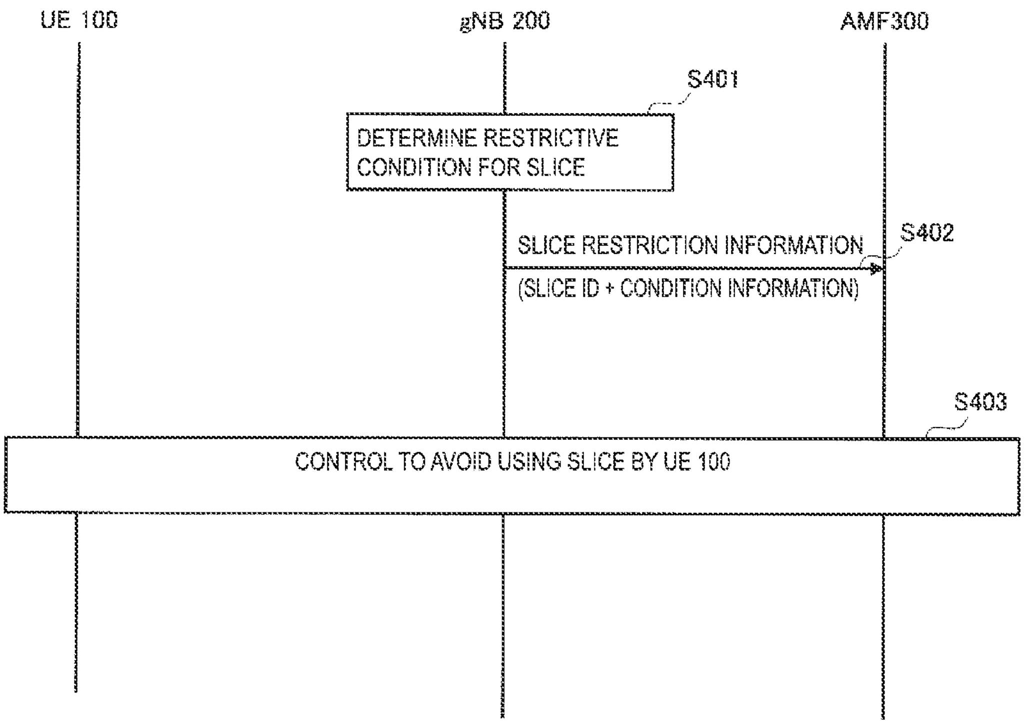
FIG. 21 is a diagram illustrating Operation Example 4 according to an embodiment.

FIG. 21 is a diagram illustrating Operation Example 4. As illustrated in FIG. 21, in step S401, the gNB 200 determines a restrictive condition for at least one of the slices the gNB 200 supports. Note that the gNB 200 may determine the restrictive condition in accordance with the slice restriction information received from the AMF 300.

In step S402, the gNB 200B transmits the slice restriction information to the AMF 300. The AMF 300 receives the slice restriction information from the gNB 200. The slice restriction information includes a set of a slice identifier for identifying the restrictive slice and condition information indicating the restrictive condition corresponding to the restrictive slice. When the gNB 200 determines the restrictive conditions for a plurality of slices, the slice restriction information may include a set of a slice identifier and condition information for each of the plurality of slices.

Here, the gNB 200 may transmit the slice restriction information using an NGAP message. Such an NGAP message is, for example, the above-mentioned NG SETUP REQUEST message, RAN CONFIGURATION UPDATE message, PDU SESSION RESOURCE SETUP RESPONSE message, PDU SESSION RESOURCE MODIFY RESPONSE message, PDU SESSION RESOURCE RELEASE RESPONSE message, or the like.

When using the PDU SESSION RESOURCE SETUP RESPONSE message, the PDU SESSION RESOURCE MODIFY RESPONSE message, or the PDU SESSION RESOURCE RELEASE RESPONSE message, the gNB 200 may transmit the slice restriction information for the slice associated with the PDU session.

In step S403, the AMF 300 performs control to avoid using the slice based on the slice restriction information. For example, when the AMF 300 receives a NAS message (e.g., a REGISTRATION REQUEST message or a PDU SESSION ESTABLISHMENT REQUEST) including a request for a restrictive slice (a slice for which a restrictive condition is set) from the UE 100, the AMF 300 rejects the request if judging that the use of the slice by the UE 100 is to be restricted based on the restrictive condition. The AMF 300 may reject the request and hand over the UE 100 to another gNB 200. For example, the AMF 300 determines, as the target gNB 200 of the handover, a gNB 200 supporting another slice associated with the service type the same as and/or similar to the slice requested by the UE 100.

Operation Example 5

In an embodiment, Operation Example 5 is described. A description is given mainly on differences from the operation example described above.

Figure 22:
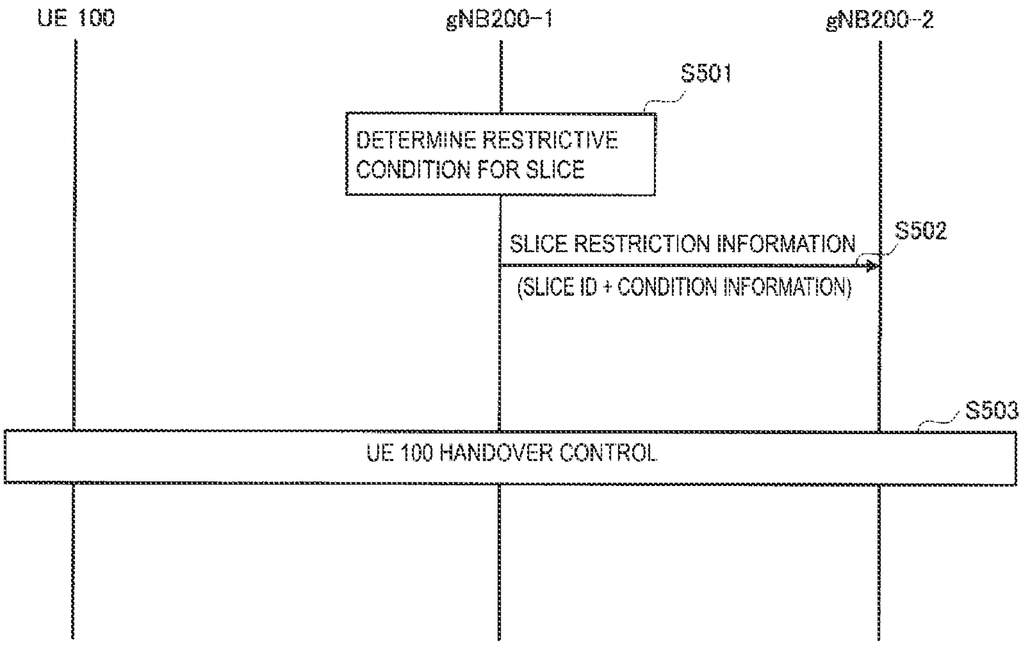
FIG. 22 is a diagram illustrating Operation Example 5 according to an embodiment.

FIG. 22 is a diagram illustrating Operation Example 5. As illustrated in FIG. 22, in step S501, a gNB 200-1 determines a restrictive condition for the slices the gNB 200-1 supports.

In step S502, the gNB 200-1 transmits the slice restriction information to a neighboring gNB 200-2. The gNB 200-2 receives slice restriction information from the gNB 200-1. The slice restriction information includes a set of a slice identifier for identifying the restrictive slice and condition information indicating the restrictive condition corresponding to the restrictive slice. When the gNB 200-1 determines the restrictive conditions for a plurality of slices, the slice restriction information may include a set of a slice identifier and condition information for each of the plurality of slices.

In step S503, the gNB 200-2 (or the gNB 200-1) performs handover control for the UE 100 based on the slice restriction information. For example, when the gNB 200-2 hands over the UE 100 that performs data transmission and reception on the restrictive slice indicated by the slice restriction information, the gNB 200-2 does not select the gNB 200-1 as the target region.

When the gNB 200-1 grasps that the UE 100 having the RRC connection with the gNB 200-1 performs data transmission and reception on the restrictive slice, and that the gNB 200-2 supports the slice, the gNB 200-1 may hand over the UE 100 to the gNB 200-2.

Other Embodiments

In the above-described embodiment, restricting the slice is described. However, contrary to the "restriction", the slice may be admitted. In the above-described embodiment, "restriction" may be read as "admission". That is, the gNB 200 or the AMF 300 may admit use of only a portion of the slices the gNB 200 or the AMF 300 supports, respectively. In this case, slices other than the slice the use of which is admitted are disabled.

The operation flows described above can be separately and independently implemented, and also be implemented in combination of two or more of the operation flows. For example, some steps of one operation flow may be added to another operation flow or some steps of one operation flow may be replaced with some steps of another operation flow.

In the embodiments and examples described above, an example in which the base station is an NR base station (gNB) is described; however, the base station may be an LTE base station (eNB) or a 6G base station. The base station may be a relay node such as an Integrated Access and Backhaul (IAB) node. The base station may be a Distributed Unit (DU) of the IAB node. The user equipment may be a Mobile Termination (MT) of the IAB node.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM. Circuits for executing processing performed by the UE 100 or the gNB 200 may be integrated, and at least a part of the UE 100 or the gNB 200 may be implemented as a semiconductor integrated circuit (chipset, System on a chip (SoC)).

The phrases "based on" and "depending on" used in the present disclosure do not mean "based only on" and "only depending on," unless specifically stated otherwise. The phrase "based on" means both "based only on" and "based at least in part on". Similarly, the phrase "depending on" means both "only depending on" and "at least partially depending on". "Obtain" or "acquire" may mean to obtain information from stored information, may mean to obtain information from information received from another node, or may mean to obtain information by generating the information. The terms "include", "comprise" and variations thereof do not mean "include only items stated" but instead mean "may include only items stated" or "may include not only the items stated but also other items". The term "or" used in the present disclosure is not intended to be "exclusive or". Further, any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a", "an", and "the" are added in the present disclosure through translation, these articles include the plural unless clearly indicated otherwise in context.

Embodiments have been described above in detail with reference to the drawings, but specific configurations are not limited to those described above, and various design variation can be made without departing from the gist of the present disclosure.

REFERENCE SIGNS

1: Mobile communication system
10: NG-RAN
20: 5GC
50: Network
100: UE
110: Receiver
120: Transmitter
130: Controller
200 (200-1 to 200-3): gNB
210: Transmitter
220: Receiver
230: Controller
240: Backhaul communicator
300: AMF
310: Backhaul communicator
320: Controller

The invention claimed is:

1. A communication control method comprising:
determining, by a first base station, a restrictive condition that is a condition configured to restrict use of a network slice, the restrictive condition indicating that the use of the network slice for cells of a tracking area (TA) is restricted; and
initiating, by the first base station, connection with a second base station via an Xn interface before a handover request is triggered by the first base station,
wherein the initiating connection includes transmitting, by the first base station, an Xn Application Protocol (AP) message including the restrictive condition to the second base station.

2. The communication control method according to claim 1,
wherein the initiating connection includes transmitting network slice restriction information to the second base station, the network slice restriction information comprising a network slice identifier configured to identify the network slice and condition information indicating the restrictive condition, and
the communication control method further comprising
performing, at the second base station, handover control for user equipment, based on the network slice restriction information.

3. A first base station comprising:

a circuitry configured to determine a restrictive condition that is a condition configured to restrict use of a network slice, the restrictive condition indicating that the use of the network slice for cells of a tracking area (TA) is restricted, the circuitry configured to initiate connection with a second base station via an Xn interface before a handover request is triggered by the first base station; and a transmitter configured to transmit an Xn Application Protocol (AP) message including the restrictive condition to the second base station during initiating of the connection with the second base station.

4. A mobile communication system comprising a first base station, wherein the first base station is configured to determine a restrictive condition that is a condition configured to restrict use of a network slice, the restrictive condition indicating that the use of the network slice for cells of a tracking area (TA) is restricted, and the first base station is configured to initiate connection with a second base station via an Xn interface before a handover request is triggered by the first base station, wherein the initiating of the connection with the second base station includes transmitting an Xn Application Protocol (AP) message including the restrictive condition to the second base station.

* * * * *